United States Patent
Paramasivam et al.

(10) Patent No.: US 9,747,237 B2
(45) Date of Patent: Aug. 29, 2017

(54) METHODS AND APPARATUS FOR RELIABLE DETECTION AND ENUMERATION OF DEVICES

(71) Applicant: APPLE INC., Cupertino, CA (US)

(72) Inventors: Arulchandran Paramasivam, Cupertino, CA (US); Barry Twycross, Cupertino, CA (US); Fernando Urbina, Cupertino, CA (US); James Hollowell, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/798,026

(22) Filed: Jul. 13, 2015

(65) Prior Publication Data

US 2016/0012000 A1   Jan. 14, 2016

Related U.S. Application Data

(63) Continuation of application No. 13/915,571, filed on Jun. 11, 2013, now Pat. No. 9,081,705.

(51) Int. Cl.
*G06F 13/38* (2006.01)
*G06F 13/40* (2006.01)
(Continued)

(52) U.S. Cl.
CPC .......... *G06F 13/387* (2013.01); *G06F 9/4411* (2013.01); *G06F 11/2247* (2013.01);
(Continued)

(58) Field of Classification Search
None
See application file for complete search history.

(56) References Cited

U.S. PATENT DOCUMENTS 6,198,477 B1  3/2001 Kurtze et al.
6,873,064 B2  3/2005 Chen
(Continued)

FOREIGN PATENT DOCUMENTS

CN   1987843 A  * 6/2007

OTHER PUBLICATIONS

English Translation—CN 1987843 A—Jun. 27, 2007—Luo, Peibin.*

*Primary Examiner* — Idriss N Alrobaye
*Assistant Examiner* — Dayton Lewis-Taylor
(74) *Attorney, Agent, or Firm* — Gazdzinski & Associates, PC (57) ABSTRACT

Methods and apparatus for reliable detection and enumeration of devices. In one embodiment, the controller comprises serialized bus protocol (e.g., a Universal Serial Bus (USB)) controller capable of supporting different bus architectures (e.g., USB 2.0 and USB 3.0) of the USB protocol (e.g., eXtensible Host Controller Interface (xHCI) controller). In one variant, when a USB-compliant device is detected over multiple bus architectures of a controller, the controller waits an additional period to allow the device to properly identify which bus architecture to use. After the time period has elapsed, if the device has been determined to be connected over the USB 3.0 bus architecture, the controller waits an additional period of time before enumerating the device. If the device is still present on the USB 3.0 bus architecture, the device continues to enumerate as a USB 3.0 advice to be made available to a host system.

20 Claims, 6 Drawing Sheets

(51) Int. Cl.
  *G06F 11/22* (2006.01)
  *G06F 13/42* (2006.01)
  *G06F 11/30* (2006.01)
  *G06F 13/10* (2006.01)
  *G06F 9/44* (2006.01)

(52) U.S. Cl.
  CPC ........ *G06F 11/3051* (2013.01); *G06F 13/102* (2013.01); *G06F 13/385* (2013.01); *G06F 13/4022* (2013.01); *G06F 13/4282* (2013.01)

(56) References Cited

U.S. PATENT DOCUMENTS

| | | | |
|---|---|---|---|
| 6,928,562 B2 | 8/2005 | Cohen et al. | |
| 7,334,054 B2 | 2/2008 | Anderson | |
| 8,073,985 B1 | 12/2011 | Ni et al. | |
| 8,185,759 B1 | 5/2012 | Li et al. | |
| 8,190,798 B1* | 5/2012 | Dalal | G06F 13/102 710/62 |
| 8,270,840 B2 | 9/2012 | Lai | |
| 8,452,910 B1 | 5/2013 | Bruhis et al. | |
| 8,582,028 B2 | 11/2013 | Zeng | |
| 8,719,475 B2 | 5/2014 | Ma et al. | |
| 8,799,537 B1 | 8/2014 | Zhu et al. | |
| 8,886,846 B2 | 11/2014 | Hussain | |
| 2003/0093598 A1* | 5/2003 | Park | H04M 1/72527 710/63 |
| 2003/0212811 A1 | 11/2003 | Thornton | |
| 2004/0024920 A1 | 2/2004 | Gulick et al. | |
| 2004/0027879 A1 | 2/2004 | Chang | |
| 2004/0030840 A1 | 2/2004 | Hesse et al. | |
| 2004/0078716 A1 | 4/2004 | Schulze et al. | |
| 2006/0282567 A1 | 12/2006 | Bhesania et al. | |
| 2007/0088895 A1* | 4/2007 | Gustafson | G06F 13/126 710/306 |
| 2007/0161459 A1 | 7/2007 | Watson | |
| 2008/0126594 A1 | 5/2008 | Monks et al. | |
| 2008/0235757 A1 | 9/2008 | Li | |
| 2009/0172384 A1 | 7/2009 | Anson | |
| 2010/0235546 A1 | 9/2010 | Terlizzi et al. | |
| 2011/0087806 A1 | 4/2011 | Mohanty et al. | |
| 2011/0131356 A1 | 6/2011 | Devam et al. | |
| 2011/0191503 A1 | 8/2011 | Kakish | |
| 2012/0017016 A1 | 1/2012 | Ma et al. | |
| 2012/0042178 A1* | 2/2012 | Ishii | G06F 1/266 713/300 |
| 2012/0062800 A1 | 3/2012 | Sisto et al. | |
| 2012/0166692 A1* | 6/2012 | Wang | G06F 13/387 710/105 |
| 2012/0210143 A1 | 8/2012 | Amemura | |
| 2012/0233373 A1 | 9/2012 | Ohashi | |
| 2013/0163474 A1 | 6/2013 | Chandra et al. | |
| 2013/0179604 A1 | 7/2013 | Lai et al. | |
| 2013/0191566 A1 | 7/2013 | Kaestner | |
| 2013/0225010 A1 | 8/2013 | Naito | |
| 2013/0275640 A1 | 10/2013 | Wang et al. | |
| 2013/0290765 A1 | 10/2013 | Waters et al. | |
| 2013/0312085 A1* | 11/2013 | Shigemasa | G06F 21/00 726/17 |
| 2013/0336334 A1 | 12/2013 | Gilbert et al. | |
| 2013/0346650 A1 | 12/2013 | Uehara | |
| 2014/0075212 A1 | 3/2014 | Urbina et al. | |
| 2014/0101315 A1 | 4/2014 | Peterson et al. | |
| 2014/0132206 A1 | 5/2014 | Zhu | |
| 2014/0181350 A1 | 6/2014 | Pedro et al. | |
| 2014/0365690 A1 | 12/2014 | Paramasivam et al. | |
| 2015/0058642 A1 | 2/2015 | Okamoto et al. | |
| 2015/0160674 A1 | 6/2015 | Burdette et al. | |

\* cited by examiner

METHODS AND APPARATUS FOR RELIABLE DETECTION AND ENUMERATION OF DEVICES

PRIORITY AND RELATED APPLICATIONS

This application is a continuation of and claims priority to co-owned and co-pending U.S. patent application Ser. No. 13/915,571 entitled "METHODS AND APPARATUS FOR RELIABLE DETECTION AND ENUMERATION OF DEVICES", filed Jun. 11, 2013, which is incorporated herein by reference in its entirety.

This application is also related to co-owned U.S. patent application Ser. No. 13/658,686 filed Oct. 23, 2012 and entitled "SHARING A GRAPHICS-PROCESSING-UNIT DISPLAY PORT", now U.S. Pat. No. 9,070,199; and co-owned and co-pending U.S. patent application Ser. No. 13/842,147 filed Mar. 15, 2013 and entitled "METHODS AND APPARATUS FOR DYNAMICALLY ALLOCATING DEVICES BETWEEN MULTIPLE CONTROLLERS", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of computerized devices, data networks and buses. More particularly, in one exemplary aspect, the present disclosure is directed to reliably detecting and enumerating resources in a resource controller.

2. Description of Related Technology

In a typical computer system, the computer system has various interface connections that are managed by internal controllers. An internal controller may be able to accommodate multiple distinct bus architectures which are routed to one or more physical connectors. However, each of the distinct bus architectures may only support a subset of the internal controller capabilities. For example, in the context of the Universal Serial Bus (USB) protocol standard, USB 3.0 compliant controllers support both so-called "Super-Speed" operation and USB 2.0 speeds (for backward compatibility). Typical implementations of a USB 3.0 controller have distinct physical connectors for both USB 2.0 and SuperSpeed.

Colloquially, the terms "interface", "port", "connector" are fluidly used and may have varying meanings according to context. However, for clarity, as used herein, the term "interface" refers without limitation to a point of logical interaction or signaling interaction between distinct entities. For example, within existing USB controller interfaces, a register determines which "port" of the USB interface is active i.e., whether the interface is operating as a USB 2.0 interface, or a USB 3.0 interface. In some cases, the USB 3.0 port may also sometimes be referred to as a "companion port" to the USB 2.0 port. As used hereinafter, the term "connector" refers without limitation to a physical connection point, bus lines, etc.

Recently, incipient products manufactured by the Assignee hereof support multiple logical interfaces via a single universal USB 2.0/USB 3.0 connector, which is automatically switched internally to an appropriate interface. Within this context, when a so-called USB 3.0 "host" and "peripheral" device are connected, the peripheral device may be detected over both of the USB 3.0 and USB 2.0 bus architectures of the host device's controller. According to extant specifications, the controller must determine which bus architecture to use for enumerating the device within a pre-defined time period.

Unfortunately, it has been empirically observed that common implementations of USB 3.0 peripheral devices may require nearly the full pre-defined time period to provide the necessary information used in determining which bus architecture to use for the peripheral device. Moreover, due to certain hardware implementations (such as is necessary to multiplex both USB 2.0 and USB 3.0 functionality to a single physical connector), in some "worst case" scenarios, a peripheral device may actually exceed the pre-defined time period to identify itself as a USB 3.0 capable device, and may instead be enumerated over the USB 2.0 architecture. Unfortunately, once a peripheral device has been enumerated as a USB 2.0 device, the enumerated peripheral device cannot re-enumerate as a USB 3.0 device. This can directly impact user experience e.g., an incorrectly enumerated USB 3.0 capable device will not have its USB 3.0 related functionalities. For example, a USB Attached SCSI (UAS) device that is enumerated as a USB 2.0 High Speed device will have a data transfer rate of approximately forty (40) megabytes per second (MB)/s, whereas the same device when enumerated as a USB 3.0 Superspeed device may support data transfer rates exceeding four hundred (400) MB/s.

Accordingly, there exists a need to improve upon the inefficiencies associated with these prior art approaches. Specifically, methods and apparatus for reliably detecting and enumerating devices to an appropriate controller bus architecture are needed.

SUMMARY

The present disclosure satisfies the foregoing needs by providing, inter alia, methods and apparatus for efficiently detecting and enumerating devices of a data network.

In a first aspect, a method for detection and control of a device is disclosed. In one embodiment, the method includes: detecting a device connection over at least one interface coupled to a plurality of resource controllers, where at least one of the plurality of resource controllers is configured to support different communication protocols; determining one or more parameters associated with the detected device connection the one or more parameters configured to identify which of the different communication protocols is associated with the device connection; when the device connection is associated with a first one of the different communication protocols, waiting an extra duration in addition to a default duration before enumerating the device connection; and otherwise enumerating the device connection at the default duration.

In one variant, the determining of the one or more parameters is based at least in part on reading a port register associated with the device connection.

In a second variant, the determining of the one or more parameters is based at least in part on negotiating one or more functions supported by the device connection.

In a third variant, the determining of the one or more parameters is based on determining one or more physical characteristics of the device connection.

In a fourth variant, the determining of the one or more parameters is performed after resetting the device connection.

In a fifth variant, the method further includes decreasing a time for the extra duration for each successful enumeration.

In a sixth variant, the method further includes increasing a time for the extra duration for each unsuccessful enumeration.

In a second aspect, a host device configured to detect and allocate device resources among a plurality of resource controllers is disclosed. In one embodiment, the host device includes: at least one interface coupled to a plurality of resource controllers, wherein the plurality of resource controllers are collectively configured to support at least two different communication protocols; and computerized logic in data communication with the at least one interface and the plurality of resource controllers. In one such exemplary embodiment, the computerized logic is configured to cause the host device to: responsive to a device connection, determine which of the at least two different communication protocols the device connection is associated with; when the device connection is associated with a first communication protocol of the at least two different communication protocols, wait a first time interval and repeat the determination of the at least two different communication protocols before an enumeration process; and otherwise perform the enumeration process.

In one variant, one or more of the plurality of resource controllers are multiplexed onto at least a first one of the at least one interface. In one such variant, the computerized logic is further configured to select one of the one or more of the plurality of resource controllers to multiplex onto at least the first one of the at least one interface. In one exemplary variant, the computerized logic is further configured to adjust the selected one of the one or more of the plurality of resource controllers to multiplex onto at least the first one of the at least one interface after the first time interval.

In a second variant, a first resource controller of the plurality of resource controllers is configured to support a subset of the at least two different communication protocols supported by a second resource controller.

In a third variant, a first resource controller of the plurality of resource controllers is configured to support a first communication protocol and a second resource controller of the plurality of resource controllers is configured to support a second communication protocol.

In a fourth variant, each device connection is associated with a port register that identifies which one of the at least two different communication protocols the device connection is associated with.

In a second embodiment, the host device includes: at least one interface coupled to a plurality of resource controllers, wherein at least one of the plurality of resource controllers is configured to support at least two different communication protocols; and computerized logic in data communication with the at least one interface and the plurality of resource controllers. In one exemplary embodiment, the computerized logic is configured to cause the host device to: responsive to a device connection, determine which of the at least two different communication protocols the device connection is associated with; and when the device connection is associated with a first of the at least two different communication protocols: wait an extra duration in addition to a default duration and thereafter select a first resource controller to service the device connection; and otherwise select a second resource controller to service the device connection.

In one variant, the computerized logic is further configured to repeat the determination of which of the at least two different communication protocols the device connection is associated with after the extra duration.

In a second variant, the first resource controller is configured to support at least two different communication protocols. In one such variant, the second resource controller is configured to support only a portion of the at least two different communication protocols. In another such variant, the at least two different communication protocols have different data rates associated therewith.

In a third variant, the computerized logic is further configured to, responsive to the device connection, reset the device connection before determination of a communication protocol the device connection is associated with.

Other features and advantages of the present disclosure will immediately be recognized by persons of ordinary skill in the art with reference to the attached drawings and detailed description of exemplary embodiments as given below.

All Figures © Copyright 2013 Apple Inc. All rights reserved.

DETAILED DESCRIPTION

Overview

The present disclosure provides, inter alia, methods and apparatus for efficiently detecting and enumerating devices of a data network. In one embodiment, the controller comprises a serial bus controller (e.g., Universal Serial Bus (USB) controller) capable of supporting different bus architectures associated with different versions of the USB protocol (e.g., USB 2.0 and USB 3.0). When an exemplary USB-compliant peripheral device is connected to the controller, the exemplary embodiment of the controller disclosed herein waits a first time period for the peripheral device to connect; if the peripheral device connects over the USB 3.0 bus architecture, then the controller waits an additional second time period before enumerating the peripheral device. If the peripheral device is still present on the USB 3.0 bus architecture after the second time period has elapsed, then the peripheral device is enumerated as a USB 3.0 device available to the host device. Otherwise, if the peripheral device is not present on the USB 3.0 bus architecture after the second time period has elapsed, then the peripheral device is enumerated as a USB 2.0 device. The foregoing advantageously avoids, inter alia, "mis-enumeration" as previously described.

As described in greater detail hereinafter, the various embodiments of the present disclosure further provide reliable detection and enumeration of devices capable of communicating over distinct bus architectures.

DETAILED DESCRIPTION OF EXEMPLARY EMBODIMENTS

Exemplary embodiments of the present disclosure are now described in detail. While these embodiments are discussed primarily in terms of a serial bus that is compliant with the Universal Serial Bus (USB) standard, it will be recognized by those of ordinary skill that the present disclosure is not in any way limited to USB-compliant technologies. The general principles described herein may be readily extended to other technologies and/or applications by artisans of ordinary skill in the arts given the contents of the present disclosure, the following therefore being merely exemplary in nature.

As used herein, the term "bus" refers without limitation to any physical and/or logical path for data transfer, transmission, receipt. Common examples of bus technologies include, without limitation: USB (Universal Serial Bus) (e.g., USB 2.0, USB On-The-Go (OTG), USB 3.0, etc.), FireWire, Thunderbolt, High Definition Multimedia Interface (HDMI), DisplayPort, etc.

Within the exemplary context of USB bus technologies, USB peripheral devices are connected in a so-called "tiered-star" topology to a single USB host device. The host device manages communication to various client devices within the network. While the following embodiments are described in relation to a tiered-star topology, those of ordinary skill in the related arts will readily appreciate that the various principles described herein are readily applicable to a myriad of other network topologies, including without limitation: daisy chains, star, ring, mesh, tree, and/or hybrids thereof. Additionally, while the following examples are presented in the context of a single host device, it should be further apparent that the various methods are in no way so limited, and may be readily implemented within e.g., peer-to-peer networks, multiple host devices, decentralized networks, etc.

USB host devices are characterized in that they contain a USB Host Controller (HC). Each USB host may have multiple USB Host Controllers (HCs), and each HC may provide one or more interfaces which support one or more USB connectors. USB peripheral devices can be directly coupled to the one or more USB connectors, and/or linked in series (or tiers) through hubs.

Host devices and peripheral devices may include, but are not limited to, personal computers (PCs) (whether desktop, laptop, handheld or otherwise), and mobile devices such as smartphones, PDAs, digital and video cameras, personal media devices (PMDs) (such as MP3 players, printers or rendering devices), tablets/phablets, or any combinations or variations of the foregoing.

During operation, a host device monitors the voltages which are present on the "bus lines" of the physical connector. When a peripheral device is connected to the host device, the bus lines are pulled to different voltages (via e.g., pull-up/pull-down resistors, etc.). For USB 2.0 and below, the connection speed of the newly connected peripheral device is identified by the bus line voltages. Once the host device identifies the appropriate connection speed, the host device enumerates the peripheral device during an initialization process. Those of ordinary skill in the related arts will appreciate that the USB enumeration process entails identification of the USB peripheral device, and loading the necessary drivers for the connected USB peripheral device (when necessary). More generally, as used hereinafter, the term "enumeration" broadly encompasses device discovery, configuration, and/or inclusion into a network.

Method—

Figure 1:
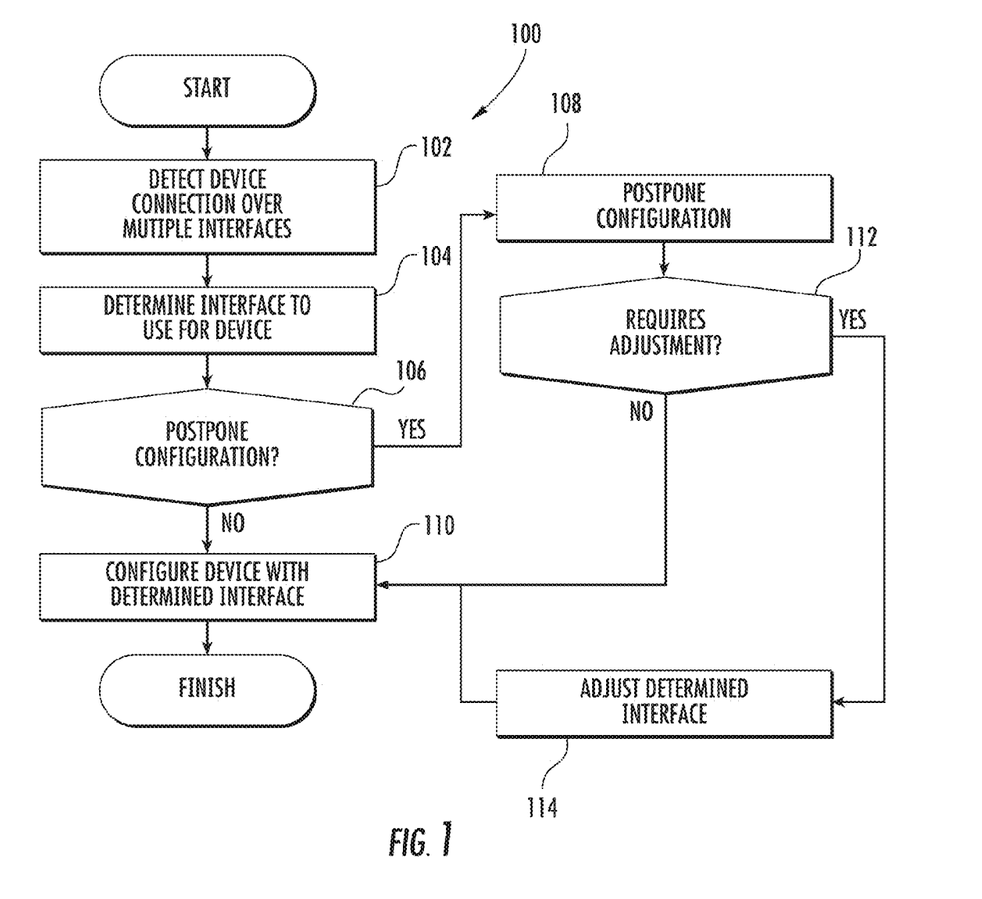
FIG. 1 is a logical flow diagram of one embodiment of a generalized method for reliable detection and control of a device.

Referring now to FIG. 1, one embodiment of a generalized method for reliable detection and control of a device is shown and described.

At step 102, a controller detects one or more device connections to one or more physical connectors. In one exemplary embodiment, the physical connectors are configured to indicate physical connection via e.g., a signal voltage. For example, when a USB-compliant peripheral device is connected to a USB-compliant host device, the physical bus lines are pulled to different voltages (via e.g., pull-up/pull-down resistors, etc.). Those of ordinary skill in the related arts will readily appreciate that a physical connection may be detected via other schemes as well e.g., out-of-band detection (e.g., user input, software input, etc.), polling, etc.

In some embodiments, the one or more connectors may support different and/or distinct sets of capabilities and functionalities. Accordingly, the connectors associated with the detected device may determine the capabilities of the detected device supported by the controller. In one exemplary embodiment, one connector may support multiple logical interfaces such as e.g., USB 2.0, USB 3.0.

Consider the scenario where the controller comprises a USB controller with at least one interface supporting USB 3.0 connection speed architecture (e.g. SuperSpeed), and at least one interface supporting USB 2.0 bus architecture. In this scenario, the USB controller detects peripheral device connection based on the differential bus lines attached to its USB connectors(s), and/or during a boot-up operation of the host device. When the USB controller detects a new peripheral device connection over at least one physical connector, the method proceeds to step 104.

At step 104, the controller determines an appropriate logical interface and/or protocol for the connected device. The determined interface and/or protocol dictates at least one or more capabilities and/or functionalities supported by the controller. For example, in the context of USB, if a USB 2.0 compliant interface is used, the controller will only support communication speeds up to the USB 2.0 maximum (e.g., low-speed, full-speed, high-speed). In addition, the determined interface(s) may limit the functionality of the detected device. For example, a peripheral device which is enumerated as a USB 2.0 device may automatically disable USB 3.0 functionality.

Within the context of USB device operation, when the exemplary controller sees an attached device, the controller resets all connected peripheral devices. After a predetermined time interval, the controller reads a register value for each "port", the value which indicates whether the corresponding device is a USB 2.0 device or USB 3.0 Superspeed device. In other technologies, the controller and/or connected device may determine or negotiate the capabilities and functionalities which are supported. For example, some bus technologies may perform capabilities negotiation. Alternately, the capabilities or functionalities are identified ahead of time, or via e.g., an out-of-band discovery type process.

In one embodiment, the controller determines which interface(s) to use based on one or more physical transmission characteristics, etc. Certain behaviors may readily distinguish one type of device from another. For example, those of ordinary skill in the related arts will readily appreciate that USB 2.0 type devices signal their speed capabilities (High Speed, Full Speed, Low Speed) with a pull-up/pull-down configuration on one or more of the bus lines. Other common examples include without limitation: initial access attempts, initial clock speeds, and training symbols. Interface selection may be for example signaled directly, or indirectly inferred by one device based on the signals or behavior of another.

In still other implementations, the controller monitors communications from the device over an initially connected interface or an initialization of an interface. The controller may monitor state information received (or not received) from the detected device and stored in memory such as, for example, registers resident on the controller. By monitoring the state information, a controller may determine if the detected device is awaiting and/or requesting communication over one or more of the interfaces. In one variant, the decision as to which interface to use may be determined based on the request for communication by the device (in its entirety, or based partly thereon).

In one embodiment, the controller may incorporate one or more delay intervals before attempting to determine the appropriate interface and/or protocol. In one such case, the controller waits a first delay period to compensate for possible intermittent behavior. More directly, by avoiding intermittent connectivity issues, the controller may more reliably determine an appropriate interface to be used for the device. For example, a newly connected USB 3.0 peripheral device attempting to connect over a SuperSpeed interface may not be able to indicate its capabilities to the controller until the internal circuitry has finished a prescribed task or achieved a given state; e.g., switching, debouncing, etc. Internal circuitry is typically implementation specific and may, in some cases, cause connection times that exceed standardized tolerances. Thus, a host controller that waits for an additional delay period can improve connection success. Common causes for intermittent connection issues include e.g., non-conformance (or marginal conformance) to the USB 3.0 standards, a poor electrical connection between the host device and the peripheral device, user-induced artifacts (e.g., unnecessary jiggling when connecting two devices), etc.

Similarly, at step 106 of the method 100, the controller determines if the configuration of the controller's interface (to communicate with the detected device) should be postponed (or, in other variants described below, what magnitude of postponement is appropriate). By postponing configuration, the controller has time to make additional determinations, and/or perform additional monitoring of the device signaling (by e.g., repeating step 104).

In one embodiment, the decision whether or not to postpone configuration in step 106 is based at least in part on the interface determined during step 104. The controller may additionally take into consideration, for example, implementation-specific factors associated with the interface, the host device's internal circuitry, and/or the peripheral device. In one variant, a postponement decision is made according to a connection speed associated of the determined interface. For example, a USB 3.0 device may have a Superspeed enabled port. The postponement period ensures that the device is correctly configured according to SuperSpeed requirements before performing enumeration as a SuperSpeed device. Postponement can reduce faulty enumeration rates (e.g., where a SuperSpeed device is incorrectly enumerated as a USB 2.0 device, or vice versa).

In other variants, the decision whether or not to postpone configuration may be based on e.g., historic use or data relating thereto, user preferences, device configuration, or a combination thereof. For instance, in one such case, the controller may determine if postponement is necessary based on e.g., previous success rates with/without postponement, and user preference (e.g., accuracy versus latency).

When postponement is needed, the method proceeds to step 108. If not, the method proceeds to step 110 to configure the device according to the determined interface(s) for the connected device.

At step 108, the controller postpones configuration. In one embodiment, configuration is postponed for a fixed duration (e.g., five hundred milliseconds (500 ms)). The fixed time period may be based on implementation specific factors associated with the interface type, the host circuitry, the peripheral device, etc. For example, the time period may be based on a USB 3.0 standard time period for a peripheral device to properly signal a SuperSpeed connection before the controller will default to a USB 2.0 interface to communicate with peripheral device. The time period may also take into account other signaling time periods associated with the USB 3.0 communication protocol. In some cases, the time period may allow for more reliable detection of SuperSpeed capable devices which operate at the end of the tolerable range of the USB 3.0 standard (thereby preventing automatic fallback enumeration as a USB 2.0 device).

In other embodiments, the time period may be adjustable. Adjustable time periods can be selected to achieve more reliable determinations of the device capabilities, while minimizing any perceptible effects of postponement. In one implementation, the adjustable postponement duration is based on a historical analysis of previous device detections. For example, the controller may record the elapsed time for a device to successfully signal a desired connection speed of the device and maintain a historic record of the elapsed times. Based on the historic record, the controller may set the postponement duration to e.g., an average, an average with tolerance, a maximum value, etc.

In another variant, the postponement duration is adjusted according to a "trial and error" scheme. For example, the postponement duration may be set by incrementally decreasing the time period for each successful determination, and increasing the time period for each unsuccessful determination. In certain cases, the size of the increases or decreases may be adjusted based on a number of consecutive successful or unsuccessful determinations. The dynamic trial and error postponement duration may be further optimized based on a history of devices connected to the host device. In yet another implementation, the time period may be adjustable by a user and/or program of the host device. For example, the user or software application may specify how aggressive (or conservative) the increment/decrement intervals should be.

In one such variant, logic (e.g., a computer program running on a processing device, or hardware/firmware, or combinations thereof) is included within the controller which is configured to dynamically optimize "user experience", such as e.g., by iteratively evaluating data relating to success rates as a function of postponement, and where evaluation of this data by the logic indicates that an incremental reduction in postponement will not appreciably affect success rate, cause such an incremental reduction. In this fashion, the logic is always tending to reduce the postponement interval to the lowest possible value (thereby reducing user-perceived delay, and ostensibly enhancing user experience).

In another variant, the logic is configured to evaluate success rate as a function of one or more operational, electrical, or physical criteria. For instance, it may be recognized that certain operational scenarios and/or use cases will produce a higher success rate than others, thereby allowing the logic to differentiate cases where a greater postponement is likely to provide a benefit (i.e., greater chance of success).

After the postponement has completed, the method proceeds to step 112.

After postponement, the controller assesses whether the determined interface(s) requires adjustment (step 112). In one embodiment, the assessment is based on the presence or absence of traffic during the postponement interval. For example, if the peripheral device has stopped traffic over the originally determined interface, then the controller will adjust interface selection. Similarly, if the peripheral device appears to be initializing a previously non-selected interface, then the controller may adjust its interface selection.

For instance, consider the aforementioned USB controller which initially identified a connected peripheral device as a USB 2.0 device. If, during the postponement period, the device has initialized the companion port registers, then the controller will assume that the peripheral device has attempted to establish a Superspeed connection. Accordingly, the controller will reassess whether the device should be treated as a Superspeed device or not.

If the controller determines a change to the interface(s) is necessary, the controller configures the device per step 114. If not, the controller configures the device per step 110.

At step 114, the controller reassigns the interface(s) to be used for the detected device. After the controller has reassigned the interface(s), the method proceeds to configure the device per step 110. At step 110, the controller configures the device according to the determined interface(s) for the connected device. In one embodiment, the configuration comprises completing the enumeration of the device with the determined interface, thus making the device accessible to one or more applications running on the host device.

Example Operation—

Figure 2:
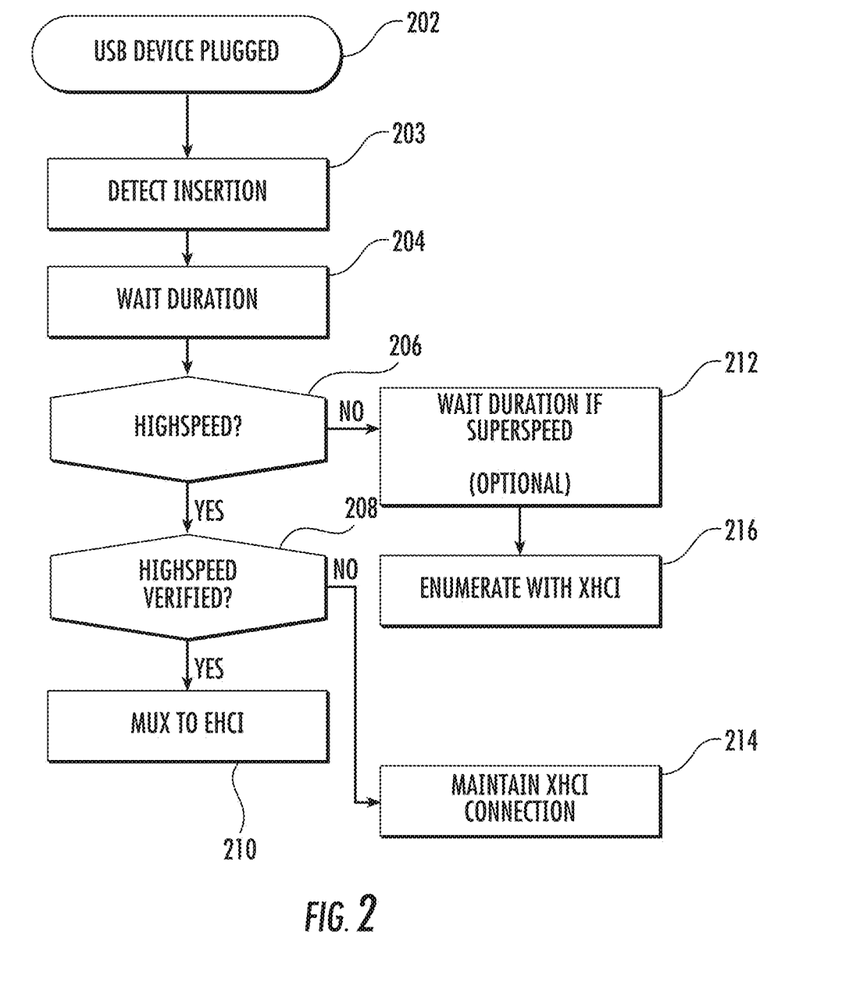
FIG. 2 is a logical flow diagram of an exemplary implementation of a method for reliably detecting and allocating a USB device to available USB controllers in accordance with the present disclosure.

Referring now to FIG. 2, one exemplary implementation of a method for reliably detecting and allocating a USB peripheral device to available USB controllers is shown and described. In one embodiment, the available controllers comprise an eXtensible Host Controller Interface (xHCI) controller configured to support a USB 3.0 interface, and an Enhanced Host Controller Interface (EHCI) controller configured to support a USB 2.0 interface.

As a brief aside, the xHCI controller is configured to support the connection speeds of USB 2.0 (High Speed, Full Speed, and Low Speed) in addition to USB 3.0 SuperSpeed. The xHCI controller includes one or more interfaces configured with USB 2.0 compliant bus architecture and one or more interfaces configured with USB 3.0 SuperSpeed bus architecture. The EHCI controller only supports USB 2.0 connection speeds.

The host controller and the USB peripheral device each maintain an internal state machine mechanism which services a state-based link training protocol. Within the context of USB 3.0, the logic for the Link Training State Machine is described at e.g., Section 7.5 Link Training and Status State Machine (LTSSM) of the Universal Serial Bus 3.0 Specification, Revision 1.00, published Nov. 12, 2008, incorporated herein by reference in its entirety).

Figure 2A:
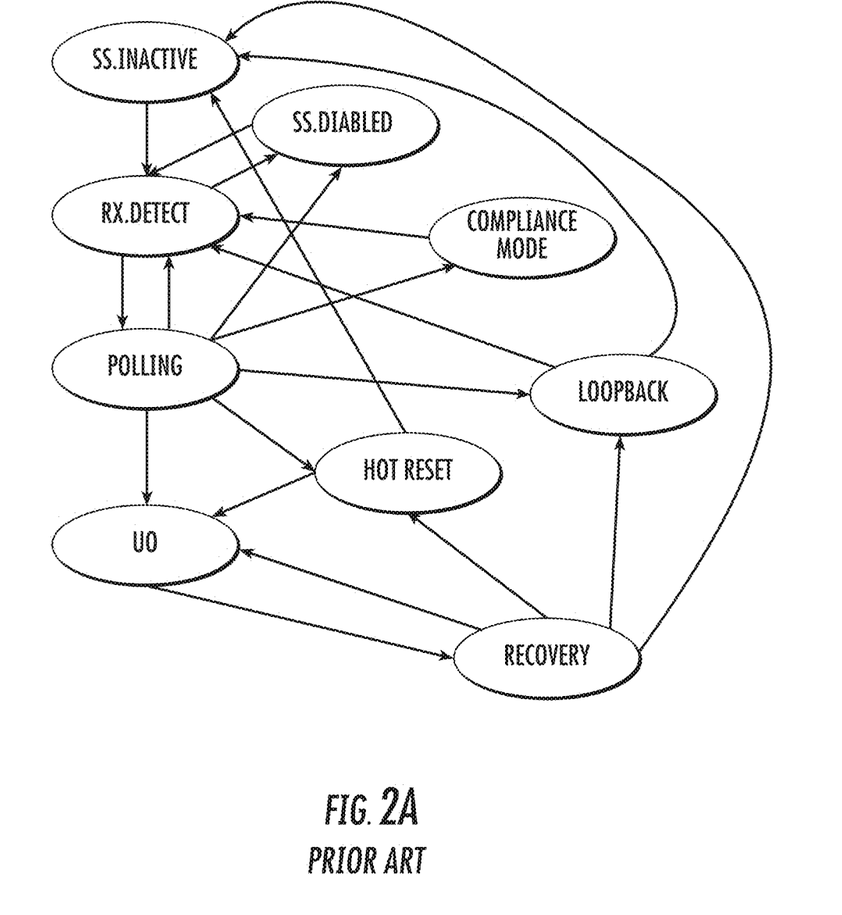
FIG. 2A is a logical representation of the prior art Link Training and Status State Machine process.

As a brief aside, link training refers to the sequence of events/transactions that occur between a host controller and a peripheral device (such as e.g., Link Training during USB 3.0 link negotiation). USB Link Training is necessary for a stable connection. FIG. 2A is a logical representation of the existing LTSSM, as described within the Universal Serial Bus 3.0 Specification, previously incorporated by reference in its entirety. The specifics of the LTSSM design are well understood within the related arts, and the portions which are unrelated to the present disclosure will not be further described.

While the following discussion is presented within the context of USB 3.0, it should be appreciated that artisans of ordinary skill may readily substitute other values or considerations to accommodate other implementations and/or technologies, given the following discussion.

Initially, the USB 3.0 ports of both the host controller and the USB peripheral device that do not have a connection are in the Rx.Detect state. Once a peripheral device is fully initialized and connected, the peripheral device and the host controller will be set to the U0 state (which is the operation state of the link). While there are multiple possible paths to transition from Rx.Detect to U0, the exemplary method of FIG. 2 is configured so as to accommodate the longest possible (but still valid) transition.

Referring now to FIG. 2, at step 202, a user plugs a USB peripheral device into the physical connector of a host device the connector is connected to both the xHCI controller and the eHCI controller.

At step 203, The xHCI controller detects the insertion of the USB peripheral device and proceeds to issue a USB Port Reset command to the detected peripheral device.

Upon issuing a USB Port Reset, the controller has up to 100 mS before the reset completes. After the USB Port Reset, the state machine will generally transition to state U0 (the operational state); however, there are a variety of other possible states which have longer transition times. For example, the link can go into a compliance mode (e.g. a "test mode"), Rx.Detect, or SS.Disabled. The longest possible transition time is dictated by the timer tPollingLFPSTimeout (360 mS). Various other link timers which may be active have timeouts on the order of 10 mS.

At step 204, the xHCI controller waits for a predetermined time interval of 500 milliseconds (mS) before attempting to enumerate the connected peripheral device. The 500 mS period is selected to be longer than, inter alia, the aggregated timeouts for the state transitions of "Link Training". Specifically, in order to ensure that the link has not transitioned to a state other than U0, the xHCI controller waits 500 mS (which is a rounded estimate for the maximum possible delay i.e., 100 mS+360 mS+miscellaneous timeouts). More directly, the predetermined interval is selected to ensure that the aforementioned Link Training sequence has executed to completion.

At step 206, after waiting the duration, the xHCI controller determines the connection speed of the device by reading the associated port register (PortSC) registers (e.g. Super-Speed, High Speed, etc.). For example, in one such implementation, if a Superspeed device is present in port A, then the Superspeed status will be in PortSC[A]; in contrast, if a non-Superspeed device is connected to port A, then the Superspeed status will be in PortSC[B]. When PortSC[A] is Highspeed, then PortSC[B] is the "companion port" for PortSC[A], and vice versa. Accordingly, both PortSC[A] and PortSC[B] must be checked to determine when a High Speed device is present.

If the register indicates a High Speed device, the method proceeds to step 208 to verify the connecting device is a High Speed. If the xHCI controller determines that the USB is connecting at a connection speed protocol other than High Speed, the method proceeds to optional step 212 or alternately to step 216.

At step 208, the controller verifies that the peripheral device is connecting at High Speed. In order to verify High Speed operation, the controller has to check both Superspeed port register (PortSC) and the companion port PortSC register for an indication that a High Speed device is physically attached. In addition, the companion port is read to determine if the link is stable. Stability of the link can be determined, for example, by checking to see if any connection status changes have occurred e.g., that a device was disconnected and reconnected, a configuration error change, a port link status change, and no warm reset change. Lastly, the companion PortSC register is checked for an indication that the SuperSpeed link is in the Rx.Detect state.

If each of the foregoing criteria is satisfied, then the peripheral device has been verified as a High Speed device and, at step 210 multiplexes the High Speed device to the EHCI controller. As the EHCI controller cannot support a SuperSpeed connection, the verification step prevents a SuperSpeed device from accidentally being multiplexed to the EHCI controller. Conversely, if the device cannot be verified as a High Speed device, then the xHCI controller maintains the connection to the device per step 214.

At step 210, the xHCI controller sends a signal to a multiplexer to direct the multiplexer to route the data connection of the port in which the USB device is plugged to an available EHCI controller, or a Rate Matching Hub (RMH) in data communication with the EHCI controller. Once the multiplexer has routed the data communication of the USB device to the EHCI, the xHCI is disconnected from the USB device. Thereafter, the EHCI proceeds to enumerate the USB device as a High Speed device per step 214. Since the xHCI controller is disconnected automatically, the xHCI does not need to request device information to identify a driver of the USB device. This reduction in unnecessary enumeration steps simplifies implementation complexity and time. Furthermore, as there has been no driver software loaded by the host device for the USB device, there is no harm of immediately disconnecting the USB device from the xHCI controller during the multiplexing procedure.

At step 212, if the USB device is determined to be connecting at SuperSpeed, the xHCI controller may optionally wait an additional duration (e.g., 100 mS) before proceeding to step 216. The additional wait allows a SuperSpeed device to further stabilize its connection prior to enumerating the USB device. For example, the USB device may have an intermittent connection due to connector instability, or the USB device may require additional time due to poor conformance with the USB 3.0 standard. By waiting for a stable connection, unnecessary "churn" can be avoided e.g., build-ups of the device in higher level software stacks during enumeration, and tear-downs due to device disconnections, etc. If the USB device is no longer detected as a SuperSpeed, the xHCI controller may forgo enumerating the device.

At step 216, the xHCI controller maintains data communication with USB device. If the USB device was determined to be attempting to connect at a Low Speed connection, the xHCI proceeds to enumerate the device via the xHCI port configured to support the USB 2.0 bus architecture. If the USB device is determined to be attempting to connect at a SuperSpeed connection, the xHCI proceeds to enumerate the device, via a USB driver, through the xHCI port configured to support the USB 3.0 bus architecture.

Figure 2B:
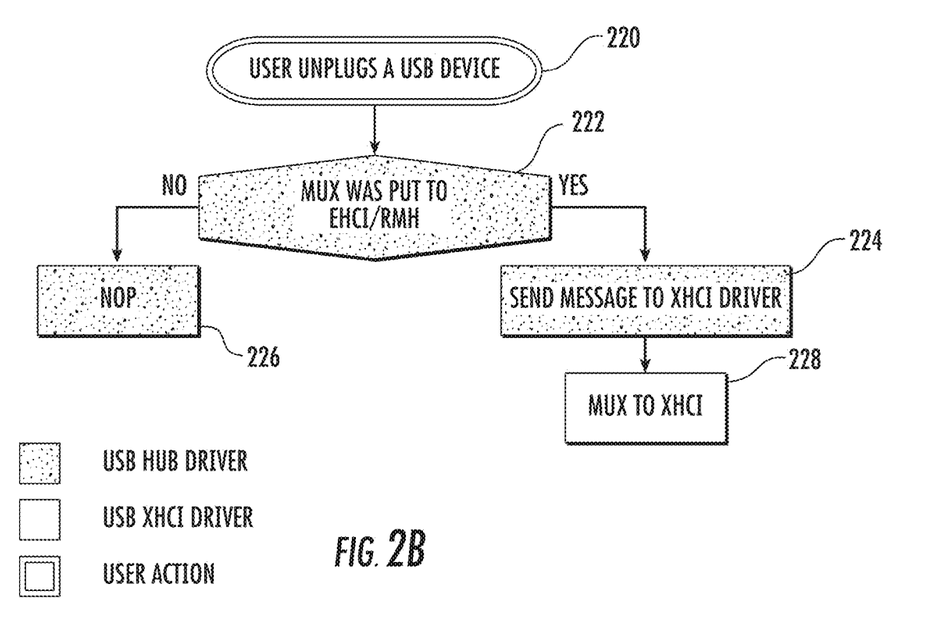
FIG. 2B is a logical flow diagram of an exemplary implementation of a method for dynamically reallocating a port in response to a USB device being disconnected from the physical connector in accordance with the present disclosure.

Referring now to FIG. 2B, one exemplary embodiment of a method for dynamically reallocating a port connection in response to a USB device being disconnected from a port is described.

At step 220, the USB hub driver of the controller responsible for the USB device detects that the USB device has been disconnected from a port by a user. For example, a disconnection may be detected by a change in voltage on the data lines of the USB connector associated with the device.

At step 222, the USB hub driver determines if the USB device was multiplexed to the EHCI controller and/or an associated RMH. If so, at step 224, the USB hub driver sends a message to the xHCI controller to request that the xHCI controller reroute the port of the USB device back to the xHCI controller, per step 224.

If not, the USB hub driver determines that no further operations on its part are needed, and performs no further operation per step 226.

At step 224, the xHCI controller sends a signal to the multiplexer to multiplex the port away from an EHCI controller back to the port of the xHCI controller configured according to the USB 2.0 bus architecture per step 228. By switching the port back to the xHCI controller, the xHCI controller can determine the connection speed responsive to subsequent connections a USB device.

Exemplary Apparatus—

Figure 3:
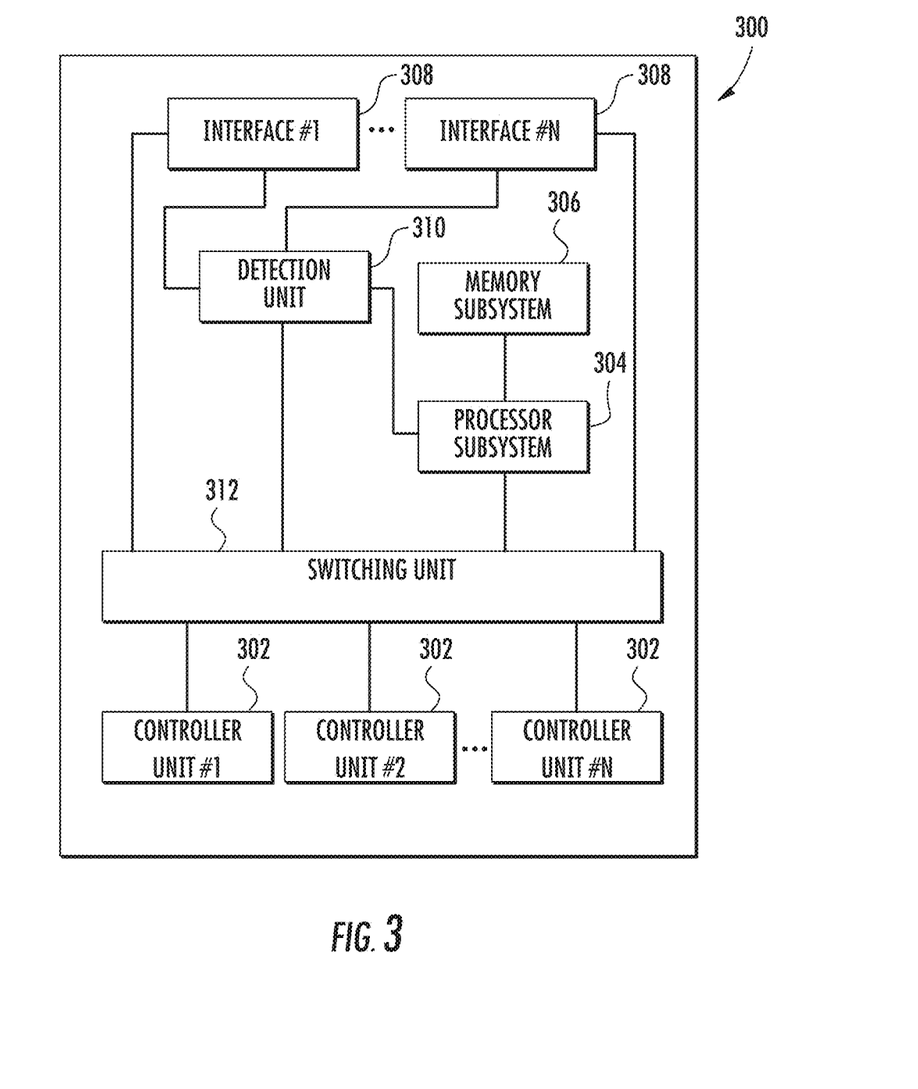
FIG. 3 is a functional block diagram illustrating an exemplary embodiment of an apparatus configured to dynamically allocate resources to available controllers in accordance with the present disclosure.

FIG. 3 illustrates one exemplary embodiment of an apparatus useful for implementing the methods of the present disclosure. The host device 300 illustrated includes a plurality of controller units 302, which manages communications between endpoints. Each of the plurality of controller units 302 may be configured with driver software has the responsibility for managing the work for the respective controller unit.

The illustrated apparatus of FIG. 3 further includes a processor subsystem 304 such as a digital signal processor, microprocessor, field-programmable gate array, or plurality of processing components mounted on one or more substrates. The processing subsystem may also comprise an internal cache memory. The processing subsystem is connected to a memory subsystem 306 comprising memory which may for example, comprise SRAM, Flash and SDRAM components. The memory subsystem 306 may implement one or a more of DMA type hardware, so as to facilitate data accesses as is well known in the art. The exemplary memory subsystem contains computer-executable instructions which are executable by the processor subsystem 304.

The illustrated apparatus further includes one or more interfaces 308. The one or more interfaces 308 may comprise for example logical interfaces internal to the apparatus, and/or external connectors (e.g., FireWire™, Universal Serial Bus™ (USB), Thunderbolt, and/or other connectors, etc.)

The controller units 302, in one embodiment, are rendered as one or more integrated circuits. As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof. The plurality of controller units 302 are responsible for, inter alia, management and control functionality of resources/devices connected to the one or more interfaces 308. Thus the controller units 302 provide, inter alia, a mechanism for the connected resource/device to communicate and operate with the host device 300.

The apparatus further includes a detection unit 310 coupled to the one more interfaces 308. The detection unit 310 is configured to detect one or more parameters of resources attempting to access the one or more interfaces 308. In one embodiment, the detection unit 310 is implemented in one or more of the plurality of controller units 302. In one particular implementation, the detection unit 310 is configured to receive USB 2.0 bus lines (i.e. D+/D−) as well as USB 3.0 SuperSpeed bus lines from the one or more interfaces 308. Accordingly, the detection unit 310 may detect one or more parameters of a connecting device via either the USB 2.0 or 3.0 bus lines, depending on how the connecting device is attempting to connect.

In another embodiment, the detection unit 310 is implemented in software (e.g., such as being stored in the memory subsystem 306 and executed by the processing subsystem 304).

A switching unit 312 is in the illustrated embodiment coupled to the one or more interfaces 308 and the plurality of controller units 302. The switching unit 312 is configured to route various connections from one or more interfaces 308 to a selected controller unit 302. In one embodiment, the switching unit 312 is configured to receive a control signal from the detection unit 310. The control signal directs the switching unit 312 to route a connection from one or more of the interfaces 308 to a desired controller unit(s) 302.

The device may also include a user interface subsystem (not shown) that includes any number of well-known I/O including, without limitation: a keypad, touch screen (e.g., multi-touch interface), mouse/trackball, LCD display, backlight, speaker, and/or microphone. However, it is recognized that in certain applications, one or more of these components may be obviated.

Figure 4:
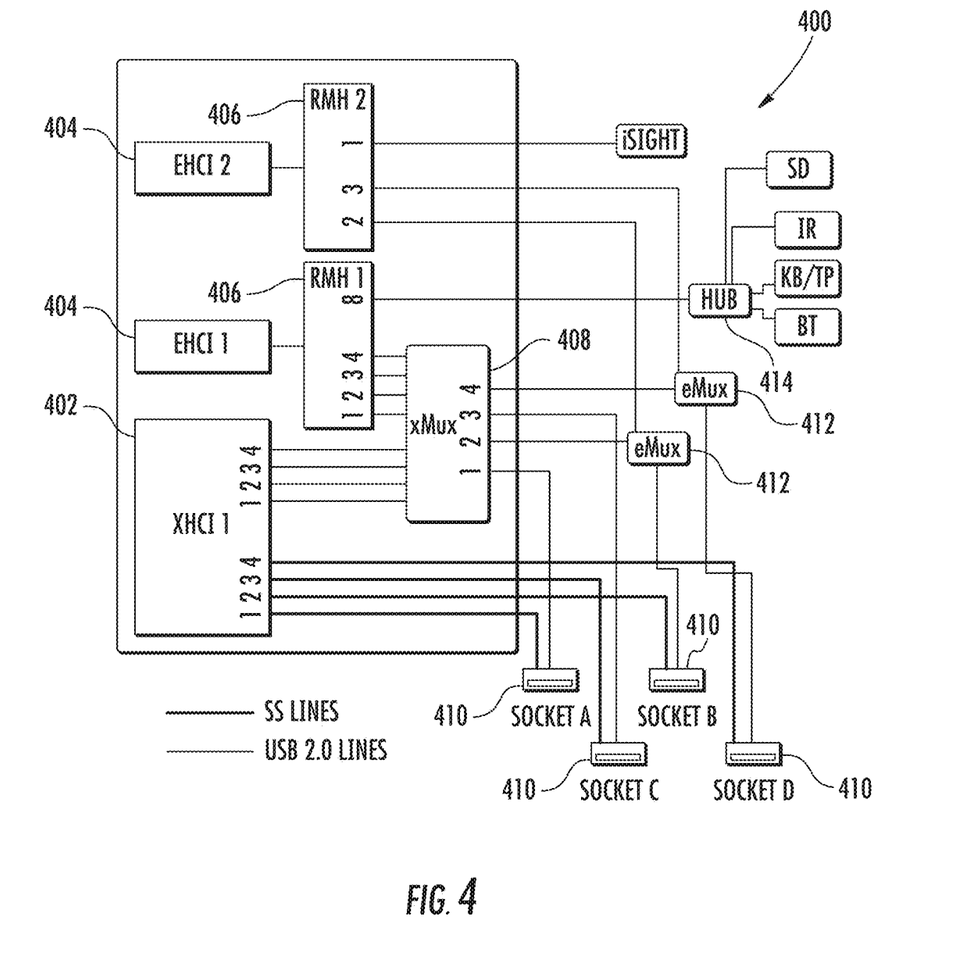
FIG. 4 is a functional block diagram illustrating an exemplary embodiment of a controller architecture in accordance with the present disclosure.

Referring now to FIG. 4, an exemplary embodiment of controller architecture useful in implementing the present disclose is shown and described. The controller architecture in this embodiment is USB-based, and comprises a xHCI controller, two EHCI controllers, two Rate Matching Hubs (RMH), and a multiplexer controlled by the xHCI controller (xMux). In addition, a plurality of USB socket connector ports are configured with USB 2.0 bus lines and USB 3.0 Super Speed (SS) bus lines. The SS bus lines are routed to various ports of the xHCI controller. The USB 2.0 bus lines are routed to the xMUX. Some of the USB socket connectors may contain an electrical multiplexer system (eMux) configured to allowed the xMux to instruct the eMux to route the USB 2.0 bus lines directly to another RHM, and accordingly a separate EHCI controller. The RMH additional have dedicated connections to various other components such as a camera device (e.g. iSight® manufactured by the Assignee hereof) or an internal root hub. The internal root hub may be connected to a variety of USB peripherals such as, for example, infrared, SD card reader, keyboard, Bluetooth, or other TP.

The xHCI is configured to detect whether or device is attempting to connect via the SS bus lines or the USB 2.0 bus lines. The xHCI controller, in the exemplary illustration, is the only controller configured to handle SS devices so any device connecting via the SS bus lines will be maintained by the xHCI controller. If a device is connecting via USB 2.0 data lines, the xHCI controller may decide to maintain control of the device itself or route the device to an EHCI controller accordingly by sending an appropriate command to the xMux. The decision to route connection over the USB 2.0 bus lines of a socket connector may be formulated based on various methodologies as discussed herein.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A host device configured to detect and allocate device resources among a plurality of resource controllers, the host device comprising:
   at least one interface coupled to a plurality of resource controllers, wherein the plurality of resource controllers are collectively configured to support at least two different communication protocols; and
   computerized logic in data communication with the at least one interface and the plurality of resource controllers, the computerized logic configured to cause the host device to:
   responsive to a device connection, determine which of the at least two different communication protocols the device connection is associated with;
   when the device connection is associated with a first communication protocol of the at least two different communication protocols, wait an adjustable first time interval based on a history of previous device connections, and repeat the determination of the at least two different communication protocols before an enumeration process; and
   otherwise perform the enumeration process.

2. The host device of claim 1, wherein one or more of the plurality of resource controllers are multiplexed onto at least a first one of the at least one interface.

3. The host device of claim 2, wherein the computerized logic is further configured to select one of the one or more of the plurality of resource controllers to multiplex onto at least the first one of the at least one interface.

4. The host device of claim 3, wherein the computerized logic is further configured to adjust the selected one of the one or more of the plurality of resource controllers to multiplex onto at least the first one of the at least one interface after the first time interval.

5. The host device of claim 1, wherein a first resource controller of the plurality of resource controllers is configured to support a subset of the at least two different communication protocols supported by a second resource controller.

6. The host device of claim 1, wherein a first resource controller of the plurality of resource controllers is configured to support the first communication protocol, and a second resource controller of the plurality of resource controllers is configured to support a second communication protocol.

7. The host device of claim 1, where each device connection is associated with a port register that identifies which one of the at least two different communication protocols the device connection is associated with.

8. A method for detection and control of a device, the method comprising:
 detecting a device connection over at least one interface coupled to a plurality of resource controllers, where at least one of the plurality of resource controllers is configured to support different communication protocols;
 reading a register associated with the detected device connection, the register being configured to identify which of the different communication protocols is associated with the device connection;
 when the device connection is associated with a first one of the different communication protocols, waiting an extra duration in addition to a default duration before enumerating the device connection;
 otherwise enumerating the device connection at the default duration; and
 decreasing a time for the extra duration for each successful enumeration.

9. The method of claim 8, wherein the reading of the register is based at least in part on reading a port register associated with the device connection.

10. The method of claim 8, further comprising determining one or more parameters based at least in part on negotiating one or more functions supported by the device connection.

11. The method of claim 8, further comprising determining one or more physical characteristics of the device connection.

12. The method of claim 8, wherein the reading of the register is performed after resetting the device connection.

13. The method of claim 8, further comprising increasing a time for the extra duration for each unsuccessful enumeration.

14. A method for detecting and allocating device resources among a plurality of resource controllers, the plurality of resource controllers being collectively configured to support at least two different communication protocols, the method comprising:
 responsive to a device connection with a host device, determining which of the at least two different communication protocols the device connection is associated with;
 when the device connection is determined to be associated with a first communication protocol of the at least two different communication protocols, waiting an adjustable first time interval based on a history of previous device connections, and repeating the determination of the at least two different communication protocols before an enumeration process; and
 otherwise performing the enumeration process.

15. The method of claim 14, multiplexing one or more of the plurality of resource controllers onto at least a first one of at least one interface associated with the host device.

16. The method of claim 15, selecting one of the one or more of the plurality of resource controllers to multiplex onto at least the first one of the at least one interface associated with the host device.

17. The method of claim 16, adjusting the selected one of the one or more of the plurality of resource controllers to multiplex onto at least the first one of the at least one interface associated with the host device after the first time interval.

18. The method of claim 14, supporting a subset of the at least two different communication protocols supported by a second resource controller with a first resource controller of the plurality of resource controllers.

19. The method of claim 14, supporting the first communication protocol with a first resource controller of the plurality of resource controllers, and supporting a second communication protocol with a second resource controller of the plurality of resource controllers.

20. The method of claim 14, associating each device connection with a port register that identifies which one of the at least two different communication protocols the device connection is associated with.

* * * * *